May 10, 1938.  C. J. WERNER  2,117,123
CONTROL SYSTEM
Original Filed Aug. 22, 1934

INVENTOR
Calvin J. Werner
BY
HIS ATTORNEYS

Patented May 10, 1938

2,117,123

UNITED STATES PATENT OFFICE 2,117,123

CONTROL SYSTEM

Calvin J. Werner, Dayton, Ohio, assignor to General Motors Corporation, Detroit, Mich., a corporation of Delaware Original application August 22, 1934, Serial No. 740,961. Divided and this application July 31, 1935, Serial No. 33,960

7 Claims. (Cl. 172—279)

This invention relates to the control of electrical motors, and more particularly to the control of an electrical motor in response to thermally responsive means.

This application is a division of my copending application for Control device Serial No. 740,961, filed August 22, 1934.

An object of this invention is to provide a control system utilizing a thermal responsive switch for controlling the starting and running circuits of an electric motor, which thermal responsive switch is so constructed and connected that the starting characteristics of the motor are satisfactory under widely varying motor load values.

This object is accomplished by providing a thermal-responsive switch for controlling the starting and running circuits of the motor, which switch has a thermal-responsive element connected in the circuit of the starting winding and responsive to starting winding current during the starting of the motor. Inasmuch as the starting winding current is fairly uniform over a range of load variations normally encountered, the switching responsive to that current will be comparatively uniform over the range, and satisfactory starting characteristics will result.

Another object of this invention is to provide a control system for an electric motor that utilizes a single thermal responsive element for controlling the starting and running circuits of the motor, and also provides overload protection for the motor.

This object is accomplished by providing a thermal-responsive switch having two sets of contacts, one of which sets of contacts controls the starting and running circuits of the motor, the other of which sets of contacts is connected to control the power supply circuit to the motor, and both of which sets of contacts are controlled by a single thermal-responsive element.

Further objects and advantages of the present invention will be apparent from the following description, reference being had to the accompanying drawing wherein a preferred embodiment of the present invention is clearly shown.

Figure 1:
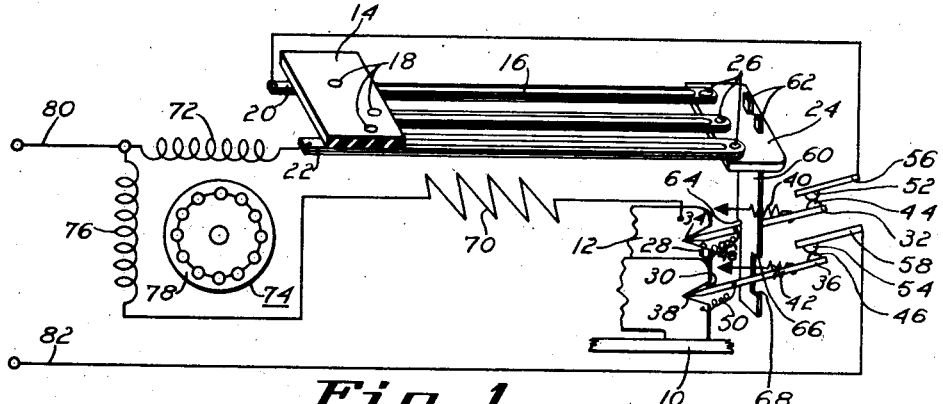
Fig. 1 is a circuit diagram showing a preferred embodiment of the present invention adapted to the control of an electric motor.

With particular reference to Fig. 1, the thermal responsive switch shown is a diagrammatic representation of the switch shown in Figs. 9 to 14 inclusive, of my above mentioned copending application, Serial No. 740,961, and is fully described in that application. This switch has a support comprising a base indicated at 10 and a frame 12 that is secured to the base. The strip of insulating material 14 is preferably secured to the frame 12, and provides an anchor and the support for one end of a thermal responsive element 16, which thermal responsive element is preferably a bimetallic member having a plurality of longitudinal portions connected in zigzag fashion to increase the electrical resistance thereof. This thermal responsive element is preferably secured to the insulating member 14 by rivets 18, or other suitable fastening means. The thermal responsive element has thermals 20 and 22 at the ends thereof that are preferably integral with the element. The other ends of the thermal responsive element 16 are secured to an insulating member 24 by means such as rivets 26.

The sides of the support 12 have substantially V-shaped notches 28 and 30 in the ends thereof. A movable contact carrying member 32 has a knife edge 34 that is disposed in the notch 28 to provide a pivotal mounting for that contact carrying member. A movable contact carrying member 36 has a knife edge 38 that cooperates with the notch 30 to provide a pivotal mounting for the contact carrying member 36. Springs 40 and 42 each have an end connected to the contact carrying members 32 and 36 respectively, and are in tension with their other ends anchored to a suitable point. These springs tend to hold the contact carrying member in position.

Contacts 44 and 46 are mounted on the contact carrying members 32 and 36 respectively, and are movable therewith. Each of these contacts is preferably positively connected to the frame 12 through leads such as 48 and 50 respectively. Cooperating stationary contacts 52 and 54 are secured to brackets 56 and 58 respectively, which contacts are respectively in alignment for engagement with contacts 44 and 46.

A link 60 has projecting tips 62 that extend through holes in the insulating strip 24, and are bent to secure the link to the insulating strip. The link 60 is notched so that it has a shoulder 64 that engages the contact carrying member 32 to effect movement of the contact carrying member in one direction in response to flexure of the thermal responsive element 16. The link 60 is also notched so that it has shoulders 66 and 68 that engage the contact carrying member 36 to effect movement of the contact carrying member in either direction in response to flexure of the thermal responsive element 16. A heater element 70, that preferably comprises a resistance, is closely associated with one surface of the thermal responsive element.

The terminal 22 of the thermal responsive element is connected to one end of an auxiliary or starting field winding 72 of a motor 74, which motor also has a main field winding 76 and a rotor 78 that is preferably of the squirrel cage type. The other end of the starting or auxiliary field winding 72 is connected to one end of the main field winding 76 and to a power supply line wire 80. The other end of the main field winding 76 is connected to one end of the heater element 70; while the other end of the heater element is connected to the frame 12 of the switch, and thence through the conductors 48 and 50 with the movable contact carrying members 32 and 36. The other end 20 of the thermal responsive element is connected to the stationary contact 52, and the other power supply line wire 82 is connected to the other stationary contact 54.

Figure 2:
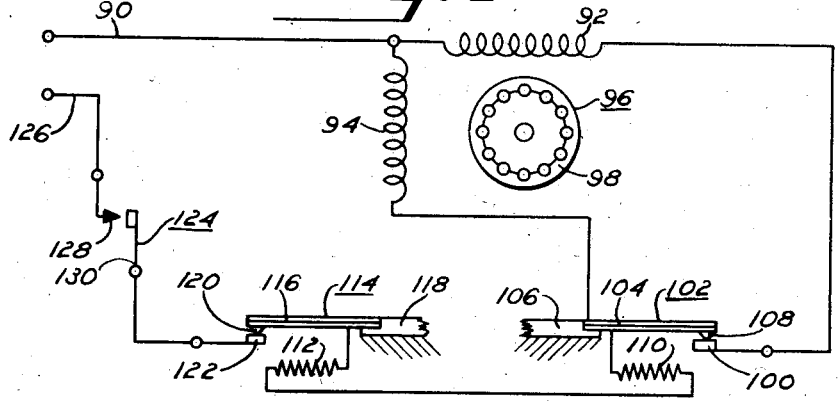
Figs. 2 and 3 are modified forms of the present invention also adapted to the control of an electric motor.

With particular reference to Fig. 2, a power supply line wire 90 is connected to one end of a starting or auxiliary field winding 92 and to one end of a main field winding 94 of a motor 96 having a rotor 98 that is preferably of the squirrel cage type. The other end of the auxiliary field winding is connected to a stationary contact 100 of a thermal responsive element 102; while the other end of the main field winding 94 is connected to one end of a thermal responsive element 104 that has one end anchored at 106 and has a contact 108 actuated by the other end in alignment for engagement with the contact 100. A heater element 110 has one end connected to the thermal responsive element 104, and its other end connected to a heater element 112 of a switch 114, either of which heater elements may be separate heater units or the inherent resistance of the thermal responsive elements themselves. The other end of the heater element 112 is connected to a thermal responsive element 116 of the switch 114, which thermal responsive element has one end anchored at 118 and a contact 120 actuated by its other end. The contact 120 is in alignment for engagement with a stationary contact 122, which stationary contact is connected to a main control switch 124 to the other power supply line wire 126. The main control switch 124 has a contact 128 and a cooperating movable contact arm 130.

Figure 3:
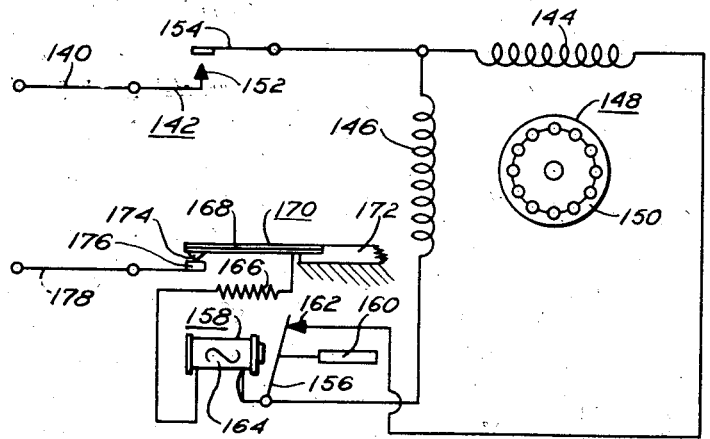

With particular reference to Fig. 3, a power supply line wire 140 is connected through a main control switch 142 to one end of a starting or auxiliary field winding 144 and to one end of a main field winding 146 of a motor 148 having a rotor 150 that is preferably of the squirrel cage type. The main control switch 142 has a contact 152 and a cooperating movable contact arm 154. The other end of the main field winding 146 is connected to a movable contact arm 156 of an electromagnetically actuated switch 158, and the movement of the contact arm 156 is preferably controlled by a dash pot 160. The other end of the auxiliary field winding 144 is connected to a stationary contact 162 that is in alignment for engagement with the contact arm 156. An electromagnet 164 is magnetically associated with the movable contact arm 156 to actuate the arm, and has one end connected to the contact arm 156 and its other end connected to one end of a heater element 166. The other end of the heater element 166 is connected to an end of a thermal responsive element 168 that is part of a thermal responsive switch 170. The heater element 166 may be either a separate resistance unit or the inherent resistance of the thermal responsive element itself. One end of the thermal responsive element 168 is anchored at 172, and the other end actuates a contact 174 that is in alignment for engagement with a stationary contact 176. The stationary contact 176 is connected to another power supply line wire 178.

The thermal responsive switches shown in Figs. 2 and 3 are preferably similar to those shown in Figs. 1 to 4 or 6 and 7 of my previously mentioned copending application Serial No. 740,961.

In the circuit shown in Fig. 1, the starting and running circuits of a single phase motor are controlled by a thermal responsive switch. The same switch also protects the motor from overload, or some such abnormal condition that might be harmful to the motor. The circuit illustrates the application of the present invention to a split phase type of alternating current motor; although it is understood that a similar control circuit and control apparatus might be applied to other types of motors or apparatus without departing from the spirit of the invention.

In the operation of the circuit shown in Fig. 1, the auxiliary field winding current flows through the thermal responsive element to directly effect heating of the thermal responsive element; while the main field winding current flows through the heater element 70 that is closely associated with the thermal responsive element so that the heating of the heater element also heats the thermal responsive element. When the motor is not running the switch contacts are normally in the position illustrated in Fig. 1. When a source of current is connected to the motor through the power line wires 80 and 82, the circuits are closed to both the main and the auxiliary field windings. However, as the rotor speed increases in the starting of the motor, the thermal responsive element is heated to a sufficient degree that by the time the rotor has reached a predetermined speed the thermal responsive element has flexed sufficiently to effect disengagement of the contacts 44 and 52, to open the circuit to the auxiliary field winding, thus switching from the starting to the running circuit of the motor. The heater element 70 is preferably so designed and positioned that the normal main field winding current at full load, or less than full load does not effect flexure of the thermal responsive element by an amount sufficient to cause disengagement of the contacts 46 and 54, but it does provide sufficient heat so that the thermal responsive element remains sufficiently flexed to maintain the contacts 44 and 52 in their disengaged position.

Such an abnormal condition as a sufficient overload on the motor causes an increase in the main field winding current that in turn increases the temperature of the heater element 70, which increase in temperature flexes the thermal responsive element to effect this engagement of the contacts 46 and 54. The disengagement of these latter contacts opens the circuits between the main field windings 76 and the power supply line wire 82 to stop the motor. The circuit will then remain open until the thermal responsive element has cooled sufficiently that the thermal responsive element flexes back to its normal position to permit the contacts to close. If the overload or abnormal condition still remains, the motor will then be started and stopped in a similar manner. It is desirable that the contacts 44 and 56 close prior to, or simultaneously with the contacts 46 and 54, so that the main field winding alone will not be connected across the power supply line wires 80 and 82 when the motor is stopped.

The circuit shown in Fig. 2 operates in a manner similar to that described for Fig. 1, except that separate control switches having separate thermal responsive elements are utilized to accomplish the starting and the overload control. In this instance, the thermal responsive elements differ in characteristics, so that the thermal responsive element 104 and the heater element 110 effect control of the starting and running circuits; while the switch 114 remains closed until some abnormal condition, such as an excessive overload on the motor, occurs. Switches such as that illustrated in Figs. 1 to 4 inclusive, of my previously mentioned copending application 740,-961, having thermal responsive elements with different operating characteristics are adapted to be used in a system such as that illustrated in Fig. 2.

The circuit illustrated in Fig. 3, operates in a manner similar to that of the circuit of Fig. 2 except that a dash pot controlled magnetic switch is utilized for controlling the circuit of the starting or auxiliary field winding 144.

From the foregoing description of the construction and mode of operation of the present control system, it will be apparent that in one aspect the system comprises chiefly a motor (74 in Fig. 1 and 96 in Fig. 2) having main and auxiliary field windings (76 and 72 in Fig. 1 and 94 and 92 in Fig. 2, respectively) and circuits therefor, and a switch comprising a thermal-responsive element (16 in Fig. 1 and 104 in Fig. 2), a heating element (70 in Fig. 1 and 110 in Fig. 2) in heat transferring relation to the thermal-responsive element (16 in Fig. 1 and 104 in Fig. 2), and a pair of cooperating contacts (52 and 44 in Fig. 1 and 100 and 108 in Fig. 2), one of which (44 in Fig. 1 and 108 in Fig. 2) is actuated by the thermal-responsive element (16 in Fig. 1 and 104 in Fig. 2) to effect engagement and disengagement of the contacts (52 and 44 in Fig. 1 and 100 and 108 in Fig. 2), said contacts (52 and 44 in Fig. 1 and 100 and 108 in Fig. 2) being connected in the circuit of the auxiliary field winding (72 in Fig. 1 and 92 in Fig. 2) to control the starting and running circuits of the motor (74 in Fig. 1 and 96 in Fig. 2), said thermal-responsive element (16 in Fig. 1 and 104 in Fig. 2) being connected in series with only the auxiliary field winding (72 in Fig. 1 and 92 in Fig. 2) and said heating element (70 in Fig. 1 and 110 in Fig. 2) being connected in the circuit of the main field winding (76 in Fig. 1 and 94 in Fig. 2).

It will also be apparent from the foregoing description of the construction and mode of operation of the present control system that in a somewhat different aspect of the present invention the system comprises chiefly a motor (74) having a starting circuit including an auxiliary field winding (72) and a running circuit including a main field winding (76), and a switch for controlling the starting and running circuits and protecting the motor against over-load, said switch comprising a thermal-responsive element (16), a pair of stationary contacts (52 and 54) insulated from each other, and a cooperating pair of movable contacts (44 and 46 respectively), each engageable with one of the stationary contacts (52 and 54 respectively), said movable contacts (44 and 46) being controlled by the thermal-responsive element (16).

While the embodiment of the present invention as herein disclosed, constitutes a preferred form, it is to be understood that other forms might be adopted, all coming within the scope of the claims which follow.

What is claimed is as follows:

1. In combination, a motor having main and auxiliary field windings and circuits therefor, and a switch comprising a thermal-responsive element, a heating element in heat transferring relation to the thermal-responsive element, and a pair of cooperating contacts one of which is actuated by the thermal-responsive element to effect engagement and disengagement of the contacts, said contacts being connected in the circuit of the auxiliary field winding to control the starting and running of the motor, said thermal-responsive element being connected in series with only the auxiliary field winding and said heating element being connected in the circuit of the main field winding.

2. In combination, a motor having main and auxiliary field windings and circuits therefor, and a switch comprising a thermal-responsive element, a heating element in heat transferring relation to the thermal-responsive element, and a pair of cooperating contacts one of which is actuated by the thermal-responsive element to effect engagement and disengagement of the contacts, said contacts being connected in the circuit of the auxiliary field winding to control the starting and running of the motor, said thermal-responsive element being connected in series with only the auxiliary field winding so as to be heated by the current flow through the auxiliary field winding and said heating element being connected in series with the main field winding to impart heat to the thermal-responsive element substantially proportional to the current flow through the main field winding.

3. In combination, a motor having main and auxiliary field windings and circuits therefor, and a switch comprising a thermal-responsive element, a pair of stationary contacts insulated from each other, a pair of movable contact carrying members each having a contact thereon for engagement with one of the stationary contacts responsive to the action of the thermal-responsive element, a heater element closely associated with the thermal-responsive element, said thermal-responsive element being connected in series with only one of the field windings, said heater element being connected in series with the other of the field windings, and said contacts being actuated at different times by the thermal-responsive element to control the starting and running of the motor and to protect the motor against overload.

4. In combination, a motor having a starting circuit including an auxiliary field winding and a running circuit including a main field winding, and a switch for controlling the starting and running circuits and protecting the motor against overload, said switch comprising a thermal-responsive element, a pair of stationary contacts insulated from each other, and a cooperating pair of movable contacts each engageable with one of the stationary contacts, said movable contacts being controlled by the thermal-responsive element.

5. In combination, a motor having a starting circuit including an auxiliary field winding and a running circuit including a main field winding, and a switch for controlling the starting and running circuits and protecting the motor against overload, said switch comprising a thermal-responsive element connected in series with the auxilary field winding, a pair of stationary contacts insulated from each other, a cooperating pair of movable contacts each engageable with one of the stationary contacts, and a heater element associated with the thermal-responsive element and connected in series with the main field winding, the heat generated in the thermal-responsive element itself mainly effecting operation of the switch to open one pair of contacts, and the heat generated in the heater element holding said pair of contacts open while the motor continues to run normally and effecting operation of the other set of contacts in the event of and abnormal condition of motor operation.

6. In combination, a motor having starting and running windings and circuits therefor, a switch having a pair of contacts for controlling the circuit of the starting winding, said switch having a thermal-responsive element connected in series with the starting winding for actuating the contacts, said thermal-responsive element being responsive to starting winding current when the motor is starting, a second set of contacts on the switch also actuated by the thermal-responsive element, said second set of contacts being connected in the circuit of the running winding, and a heater element connected in series with the main field winding, said heater element being located adjacent the thermal-responsive element to heat the thermal-responsive element and effect actuation of the second set of contacts in case of an overload on the motor.

7. In combination, a motor having starting and running windings, and a switch having a thermal-responsive element and a pair of contacts, one of which contacts is actuated by the thermal-responsive element to effect engagement and disengagement of the contacts, said contacts and thermal-responsive element being connected in series with only one of said windings to effect disengagement of the contacts responsive to the current flow through the winding with which the thermal-responsive element is in series during starting of the motor, and means connected in series with the other of said windings for maintaining the contacts in disengaged relation after the motor is started and until the current flow through the said other of said windings is considerably diminished.

CALVIN J. WERNER.